June 21, 1955  J. J. RICHARDSON  2,711,163
TARGET TRAP
Filed April 17, 1952  3 Sheets-Sheet 2
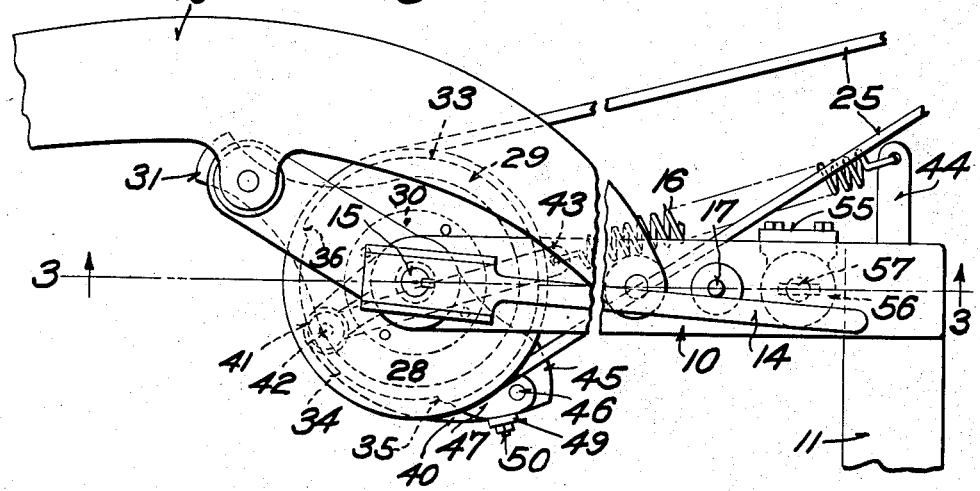
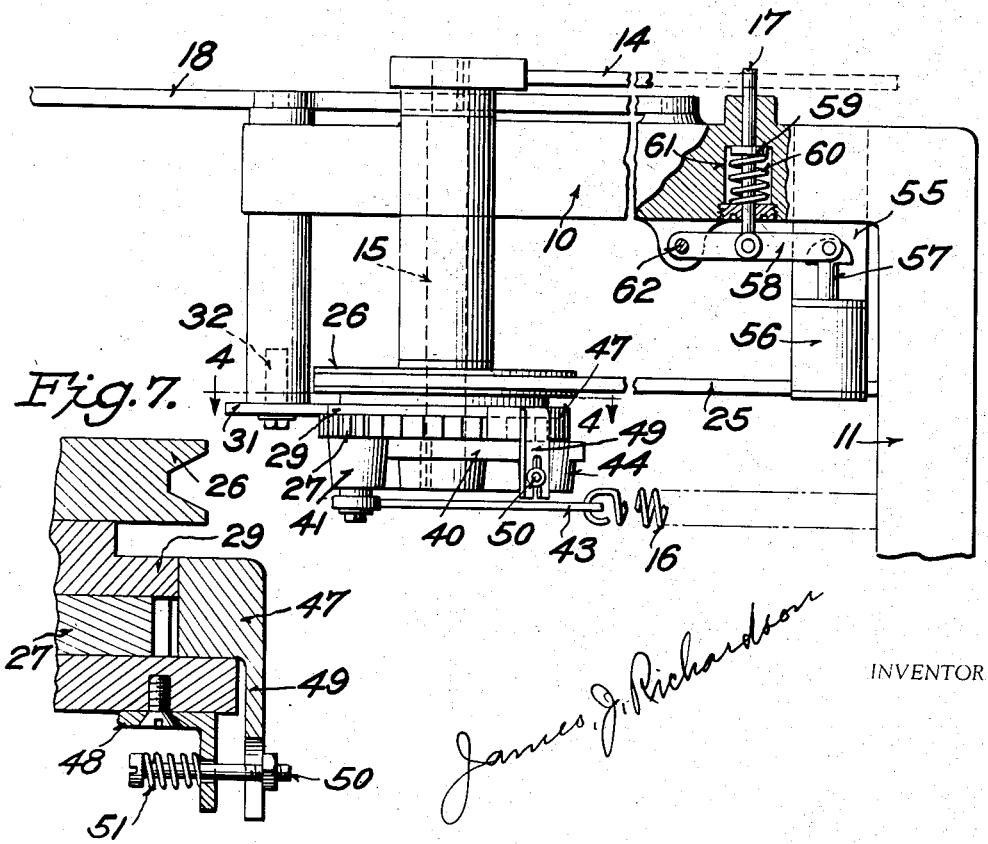
INVENTOR
James J. Richardson

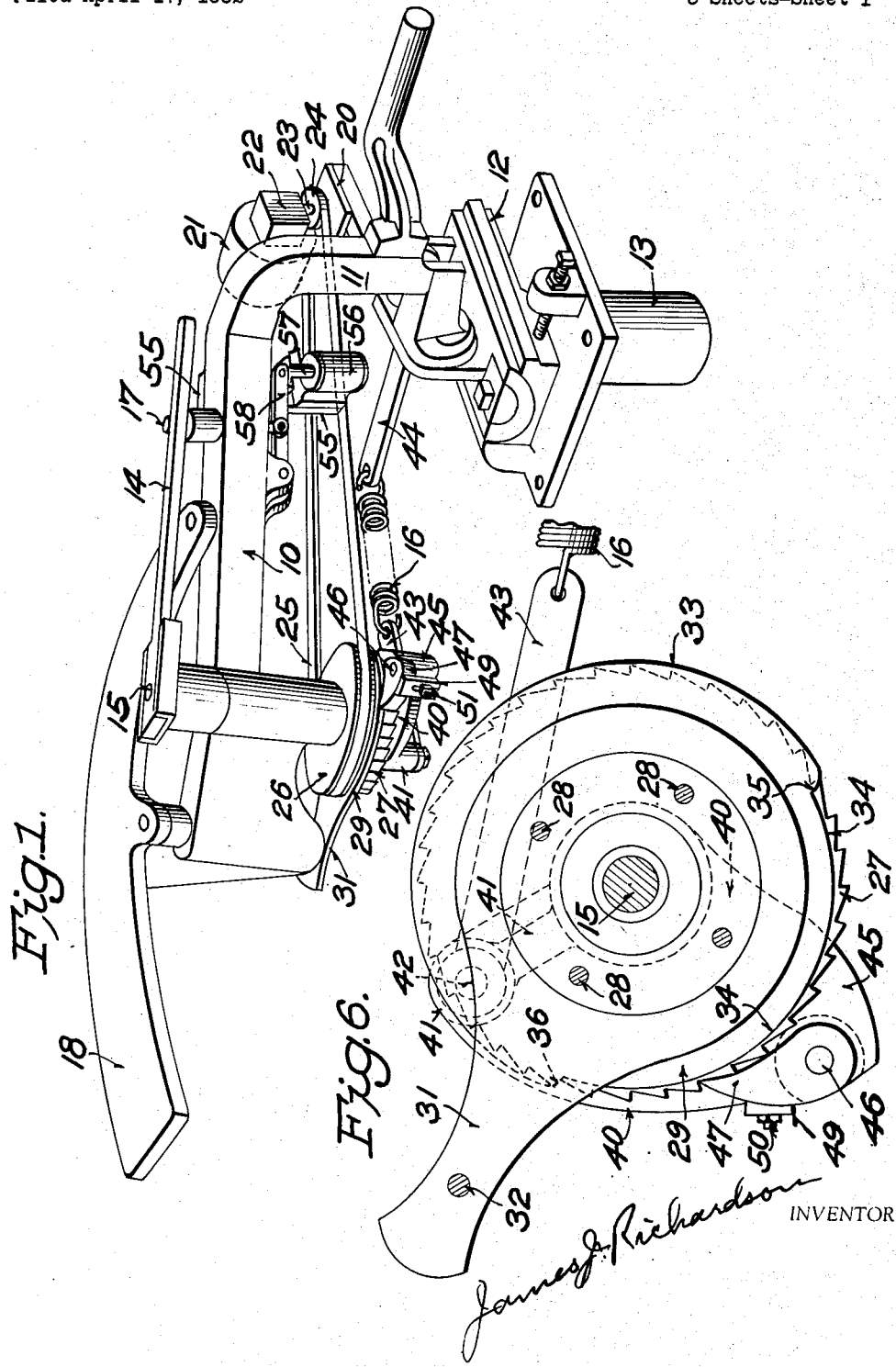

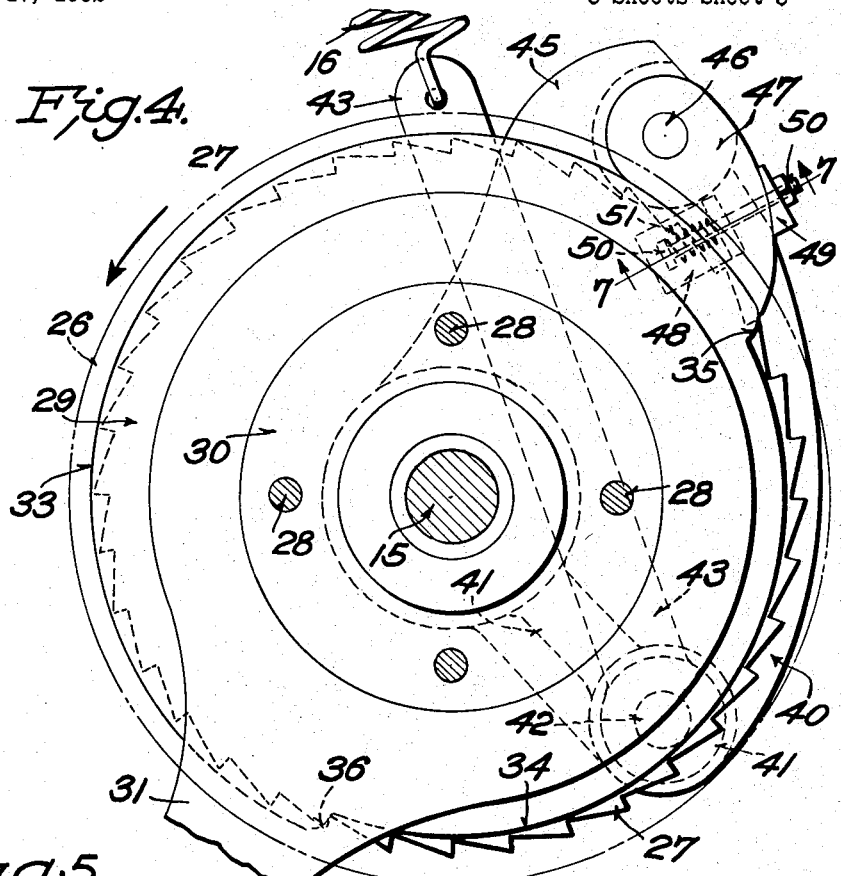
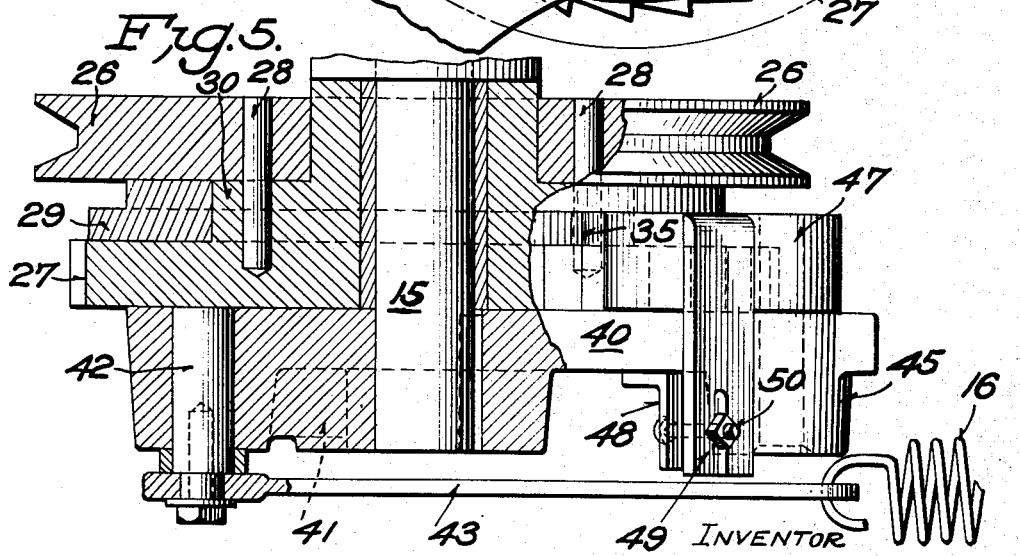

United States Patent Office 2,711,163
Patented June 21, 1955

2,711,163

TARGET TRAP

James J. Richardson, Virginia, Minn.

Application April 17, 1952, Serial No. 282,837

2 Claims. (Cl. 124—8)

My invention relates to improvements in target traps, and more particularly to the type of trap which is usually used in what is known as trap shooting or skeet shooting.

It is an object of my invention to provide a target trap which is simple in construction and easy to operate by the one in charge.

Heretofore, in the well known traps of this character, the cocking of the trap has been accomplished by the manual operation of a handle, manipulated by an operator and requiring a considerable amount of strength to cock the throwing arm against the pull of a strong spring. Furthermore, if the operator got his hand or arm in the path of the throwing arm, while cocking or releasing the same, he could cause serious injury to himself.

In my improved trap the operating handle is done away with and the throwing arm is cocked by a mechanism, driven by an electric motor, or other power means, and the releasing is done by closing an electric switch, which may be located a distance from the trap, so there is no danger to the operator.

It is another object of my improvement to provide a mechanism that may be applied to any of the well known types of traps, now on the market, with a minimum amount of change of construction.

It is a further object to provide a mechanism which is comparatively cheap to manufacture and which may be applied to a trap by anyone familiar with these devices.

With these and other objects in view, my improvements consist of the novel arrangement of parts which will be hereinafter more fully described and pointed out in the appended claims.

In the accompanying drawings, forming part of this application:

Figure 1 is a perspective view of a target trap, with my improved cocking and releasing mechanism applied, parts of the trap being shown somewhat diagrammatically.

Figure 2 is a plan view.

Figure 3 is a side view of Fig. 2.

Figure 4 is a horizontal section on the line 4—4 of Figure 3, with parts shown when the throwing arm is in cocked position.

Figure 5 is an elevational view of the mechanism shown in Figure 4, parts being shown in section.

Figure 6 is a view similar to Figure 4 but showing parts in the position when the throwing arm has been released and the force of the spring has been expended, and Figure 7 is a detail sectional view on the line 7—7 of Figure 4.

In the form of target trap shown in the drawings 10 represents the main arm of the frame and in practice is inclined at a slight angle to the horizontal. This arm is integral with a supporting arm 11, pivoted on the base 12, the latter have a vertical bearing member 13 to allow for rotation of the frame in a table or support for the trap. The base is, of course, provided with various adjustments to allow for angling the trap, as is well known in the art. A throwing arm 14 is keyed on the upper end of a vertical shaft 15, rotatably secured in the arm 10, near its outer end, the shaft being rotated counterclockwise by a tension spring 16 when the trap is released. A vertically movable pin 17 is mounted in the frame arm 10 and holds the throwing arm 14 against rotation when the trap is cocked. An arcuate plate 18 is secured to the frame arm 10, and the targets are placed on this plate to be struck by the throwing arm when it is released by the operation of pin 17.

The structure, as so far set forth, is common to target traps well known in the art, and an example is illustrated in a circular of the Remington Arms Company, Inc. called "The Remington Trap, Hand Angling Type—Model 39." Applicant has shown his invention applied to this type of trap, certain details of which are omitted. This type of trap is "cocked"—or the spring operating the throwing arm is tensioned—by the movement of a hand lever. In applicant's device this hand cocking mechanism is omitted and the cocking and releasing is operated by means which will now be described.

Mounted on the base 12 in any desired manner is a plate 20, supporting an electric motor 21, provided with a gear reduction unit 22. A shaft 23 projects from the unit 22 and has mounted thereon a small pulley 24. A belt 25 connects pulley 24 with a larger pulley 26 mounted for rotation about the shaft 15. A ratchet 27 is secured to the pulley 26 by pins 28 and the two always rotate together, and continually, as long as the motor is running.

A cam 29 is mounted on a hub 30 of the ratchet 27 and has an extension 31 secured by a pin 32 to the arm 10, to prevent rotation of the cam. The cam has two concentric portions 33 and 34, the portion 33 being of greater radius than the portion 34 and preferably extending approximately 225 degrees of a circle, from the point 35 to the point 36. The radius of the portion 34 is less than the dedendum of the teeth of the ratchet.

A member 40 is keyed or fixed to the shaft, below the ratchet 27, and has a radial arm 41 carrying a pin 42. A link 43 is secured at one end, to the pin, and the opposite end of the link is connected to the spring 16. The opposite end of the spring is secured to a projection 44 on the base 12 and an adjusting means for the spring may be provided if desired. An extension 45 is part of the member 40, and carries a pin 46 approximately 90 degrees from the arm 41. A pawl or dog 47 is pivoted on the pin 46 and is adapted to engage the portion 33 of cam 29 or the teeth of ratchet 27. An L shaped bracket 48 is secured to the under surface of member 40 and a lug 49 extends downwardly from the pawl 47. A bolt or pin 50 passes through the lug 49 and the vertical leg of the bracket 48, and a spring 51 surrounds the bolt between its head and the bracket. This spring serves to keep the pawl in engagement at all times with either the cam or the ratchet.

A plate 55 is secured to the arm 10 and has mounted thereon a solenoid 56, having an armature 57. A link 58 is secured at one end to the armature and at its other end is pivoted on a lug on the arm 10.

Intermediate its ends the link has a pin and slot connection with the pin 17, the latter having a flange 59, engaged by a spring 60 in a pocket 61 of the arm 10, so that the pin 17 is normally urged upwardly with its upper end in the path of movement of throwing arm 14, but may be pulled downwardly out of the path of movement by the link 58, when the solenoid 56 is energized.

*Operation*

When the target trap is cocked the parts are in the position shown in Figures 1 to 5, with the throwing arm 14 bearing against the pin 17, and the arm 41, link 43 and spring 16 in the position shown in Figure 2 with relation to shaft 15, the spring being under tension. Also the pawl 47 will be on the high part of the cam, adjacent point 35 as shown in Figure 4. When the solenoid is energized by closing a switch (not shown) the pin 17 will be drawn downwardly out of the path of arm 14, and the contraction of spring 16 will cause the throwing arm to rotate counterclockwise, and sweep the target off of the plate 18, the speed of rotation of the arm being greater than the speed of the ratchet. When the force of the spring has been expended the member 40 will have rotated nearly three quarters of a revolution and the arm 41 and pawl 47 will be in the position shown in Figure 6 with the pawl having passed the point 36 and engaging the ratchet 27. It will be remembered that the ratchet is continually rotating and as it is engaged by the pawl it will carry the latter around to the position shown in Figures 2 and 4, again tensioning the spring. The pawl 47 reaching the point 35 on the cam 29 will be disengaged from the ratchet and the rotation of shaft 15 will stop, with the arm 14 again engaging the pin 17. Thus the throwing arm is again in cocked position, with the spring 16 under tension, ready to throw another target when the solenoid 56 is energized.

Various slight changes may be made in the arrangement of parts described without departing from my invention and hence I do not limit myself to the precise details set forth but consider myself at liberty to make such changes and alterations as fairly fall within the spirit and scope of the appended claims.

I claim:

1. A target throwing apparatus comprising a shaft, a rotatable throwing arm fixed on the upper end of the shaft, a pin normally holding the arm against rotation, a member on the lower end of the shaft, a spring connected to the member to rotate the shaft, a pulley rotatable with respect to the shaft, a ratchet secured to the pulley above the member, an arcuate cam secured between the pulley and the ratchet and held against rotation, means for driving the pulley and ratchet, a pawl pivoted on the member and adapted to engage the ratchet during part of its rotation with the shaft and member, and to be held out of engagement with the ratchet, by the cam, during the balance of its rotation, said cam being of sufficient arcuate extent to maintain the pawl disengaged from the ratchet during the throwing movement of the arm, and means for moving the pin out of the path of the throwing arm to allow rotation of the arm.

2. The combination of a target trap including a base, an arm extending laterally from the base in one direction, a plate extending in the opposite direction, and a target throwing mechanism mounted on the arm comprising a shaft rotatable in the arm, a throwing arm on the upper end of the shaft, a pin normally holding said throwing arm against rotation, a member on the lower end of the shaft, a spring secured to the member tending to rotate the shaft and throwing arm, a pulley located above the member and rotatable about the shaft, a motor on the plate, a pulley on the motor, means connecting the two pulleys, a stationary cam located below the first mentioned pulley, a ratchet secured to the first mentioned pulley and located between the cam and the member, a pawl on the member adapted to engage the ratchet and be driven thereby during part of its rotation, and to be disengaged by the cam during the balance of its rotation, said cam being of sufficient arcuate extent to maintain the pawl disengaged from the ratchet during the throwing movement of the arm, and means to move the pin out of the path of the throwing arm to allow it to rotate.

References Cited in the file of this patent

UNITED STATES PATENTS

| | | |
|---|---|---|
| 1,475,713 | Napier | Nov. 27, 1923 |
| 1,564,884 | North | Dec. 8, 1925 |
| 2,078,166 | Schwerin | Apr. 20, 1937 |